United States Patent
Wang et al.

(10) Patent No.: US 9,899,728 B2
(45) Date of Patent: Feb. 20, 2018

(54) MOBILE TERMINAL

(71) Applicant: HUAWEI DEVICE (DONGGUAN) CO., LTD., Dongguan (CN)

(72) Inventors: Hongyu Wang, Shenzen (CN); Yufei Sun, Shanghai (CN); Huimin Zhang, Shenzhen (CN); Dongjian Zhang, Shenzhen (CN); Kun Feng, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 14/947,042

(22) Filed: Nov. 20, 2015

(65) Prior Publication Data

US 2016/0079659 A1    Mar. 17, 2016

Related U.S. Application Data

(63) Continuation of application No. PCT/CN2014/077949, filed on May 21, 2014.

(30) Foreign Application Priority Data

May 22, 2013 (CN) .......................... 2013 1 0196497

(51) Int. Cl.
*H01Q 1/24* (2006.01)
*H01Q 1/48* (2006.01)
(Continued)

(52) U.S. Cl.
CPC ............... *H01Q 1/243* (2013.01); *H01Q 1/24* (2013.01); *H01Q 1/48* (2013.01); *H01Q 21/28* (2013.01); *H04M 1/0283* (2013.01)

(58) Field of Classification Search
USPC .......................................... 343/702, 700 MS
See application file for complete search history.

(56) References Cited

U.S. PATENT DOCUMENTS

| | | | | |
|---|---|---|---|---|
| 7,551,142 B1 * | 6/2009 | Zhang | ............... | H01Q 1/243 343/700 MS |
| 7,825,863 B2 * | 11/2010 | Martiskainen | ......... | H01Q 1/243 343/700 MS |
| 2011/0254741 A1 * | 10/2011 | Ishimiya | ............... | H01Q 1/243 343/702 |

FOREIGN PATENT DOCUMENTS

CN    201282187 Y    7/2009
CN    201491423 U    5/2010
(Continued)

OTHER PUBLICATIONS

International Search Report dated Jul. 9, 2014, in corresponding International Application No. PCT/CN2014/077949.
(Continued)

*Primary Examiner* — Jessica Han
*Assistant Examiner* — Hai Tran
(74) *Attorney, Agent, or Firm* — Staas & Halsey LLP

(57) ABSTRACT

An embodiment of the present invention discloses a mobile terminal, which relates to the field of communications technologies and is invented to enable the mobile terminal to have relatively good metal texture and appearance. The mobile terminal includes a metal rear cover used as a grounding component and at least one antenna, where the antenna includes a grounding pin, and the grounding pin is electrically connected to the metal rear cover. The present invention is mainly applicable to mobile terminal products.

17 Claims, 8 Drawing Sheets

(51) Int. Cl.
*H01Q 21/28* (2006.01)
*H04M 1/02* (2006.01)

(56) References Cited

FOREIGN PATENT DOCUMENTS

| CN | 201994985 U | 9/2011 |
|---|---|---|
| CN | 102522625 A | 6/2012 |
| CN | 103022689 A | 4/2013 |
| CN | 103327144 A | 9/2013 |
| EP | 2775376 A1 | 9/2014 |
| WO | 2010/027565 A2 | 3/2010 |
| WO | 2013/065410 A1 | 5/2013 |

OTHER PUBLICATIONS

Extended European Search Report dated Jun. 2, 2016 in corresponding European Patent Application No. 14801202.4.
International Search Report dated Jul. 9, 2014 in corresponding International Patent Application No. PCT/CN2014/077949.
Chinese Notification of Re-Examination dated May 2, 2017 in corresponding Chinese Patent Application No. 201310196497.4.
J.R. James et al. "Microstrip Antenna: Theory and Design" Peregrinus on behalf of the Institution of Electrical Engineers, 1980, preface and p. 106.

\* cited by examiner

MOBILE TERMINAL

CROSS-REFERENCE TO RELATED APPLICATIONS

This application is a continuation of International Application No. PCT/CN2014/077949, filed on May 21, 2014, which claims priority to Chinese Patent Application No. 201310196497.4, filed on May 22, 2013, both of which are hereby incorporated by reference in their entireties.

TECHNICAL FIELD

The present invention relates to the field of communications technologies, and in particular, to a mobile terminal.

BACKGROUND

With the continuous development of design of mobile terminals including a mobile phone, a tablet computer, a Personal Digital Assistant (PDA), and the like, industrial design (ID) of housings of the mobile terminals is also gradually valued by people. ID of a metal housing has become a trend and a tide of design of a mobile terminal. Because the metal housing has better persistence than that of a plastic housing, and has comfortable metal hand-feeling and excellent appearance, the ID of the metal housing gets increasingly more popular with people.

For example, for ID of housings of mobile phones, in numerous mobile phone vendors, the ID of the housings of the mobile phones is basically divided into two categories: one category is metal frame design, that is, a bezel of a mobile phone is designed to be a metal ring, thereby forming a metal bezel; and the other category is local metal design on a rear cover of a mobile phone, that is, to avoid interference to an antenna, a part, corresponding to the antenna of the mobile phone, of the rear cover of the mobile phone is in nonmetallic design, and the remaining parts are all in metal design.

However, the metal frame design causes the whole mobile phone to have no comfortable metal hand-feeling and causes the mobile phone to have undesirable texture; and the local metal design on the rear cover of the mobile phone causes a boundary (a transitional boundary between a nonmetallic part and a metal part) similar to a seam to occur in the rear cover of the mobile phone, which affects appearance of the mobile phone.

SUMMARY

An embodiment of the present invention provides a mobile terminal, and can enable the mobile terminal to have relatively good metal texture and appearance.

To achieve the foregoing objectives, the embodiment of the present invention uses the following technical solutions.

According to an aspect, a mobile terminal is provided in the present invention, including a metal rear cover used as a grounding component and at least one antenna, where the antenna includes a grounding pin, and the grounding pin is electrically connected to the metal rear cover.

With reference to the aspect, in a first possible implementation manner, the grounding pin is electrically connected to the metal rear cover by means of a first electric conductor.

With reference to the aspect, in a second possible implementation manner, the mobile terminal further includes a printed circuit board accommodated between the metal rear cover and the display, where a radio frequency circuit and the reference ground that are corresponding to the antenna are disposed on the printed circuit board, and the reference ground is connected to the metal rear cover.

With reference to the second possible implementation manner, in a third possible implementation manner, that the grounding pin is electrically connected to the metal rear cover is specifically: the grounding pin is connected to the reference ground and is electrically connected to the metal rear cover by means of the reference ground.

With reference to the second or the third possible implementation manner, in a fourth possible implementation manner, the antenna further includes a feeding pin, and the feeding pin is electrically connected to the radio frequency circuit corresponding to the antenna.

With reference to the aspect or any one of the first to the fourth possible implementation manners, in a fifth possible implementation manner, the antenna further includes an antenna component.

With reference to the fifth possible implementation manner, in a sixth possible implementation manner, the antenna component is an independent metal component.

With reference to the fifth possible implementation manner, in a seventh possible implementation manner, a bezel is disposed on the metal rear cover.

With reference to the seventh possible implementation manner, in an eighth possible implementation manner, the antenna component is partially or completely made up of a metal structural component of the bezel.

With reference to the eighth possible implementation manner, in a ninth possible implementation manner, that the antenna component is partially or completely made up of a metal structural component of the bezel is specifically: the antenna component is partially or completely made up of a part of the metal structural component of the bezel.

A mobile terminal according to the embodiment of the present invention includes a metal rear cover used as a grounding component and at least one antenna, where the antenna includes a grounding pin, and the grounding pin is electrically connected to the metal rear cover. Because the metal rear cover is used as the grounding component, and in this way, the metal rear cover is used as a ground cable of the antenna, interference to the antenna from the metal rear cover can be avoided, and integrity of the metal rear cover can be further ensured. Moreover, it can be clearly seen from a rear view of the mobile terminal that an entire back of the mobile terminal is all-metal, which not only enables the mobile terminal to have good appearance, but also enables the whole mobile terminal to have relatively good metal texture.

BRIEF DESCRIPTION OF DRAWINGS

To describe the technical solutions in the embodiment of the present invention more clearly, the following briefly introduces the accompanying drawings required for describing the embodiment. Apparently, the accompanying drawings in the following description show merely one embodiment of the present invention, and a person of ordinary skill in the art may still derive other drawings from these accompanying drawings without creative efforts.

DESCRIPTION OF EMBODIMENT

The following clearly and describes the technical solutions in the embodiment of the present invention with reference to the accompanying drawings in the embodiment of the present invention. Apparently, the described embodiment is merely one but not all of the embodiments of the present invention. All other embodiments obtained by a person of ordinary skill in the art based on the embodiment of the present invention without creative efforts shall fall within the protection scope of the present invention.

Figure 1:
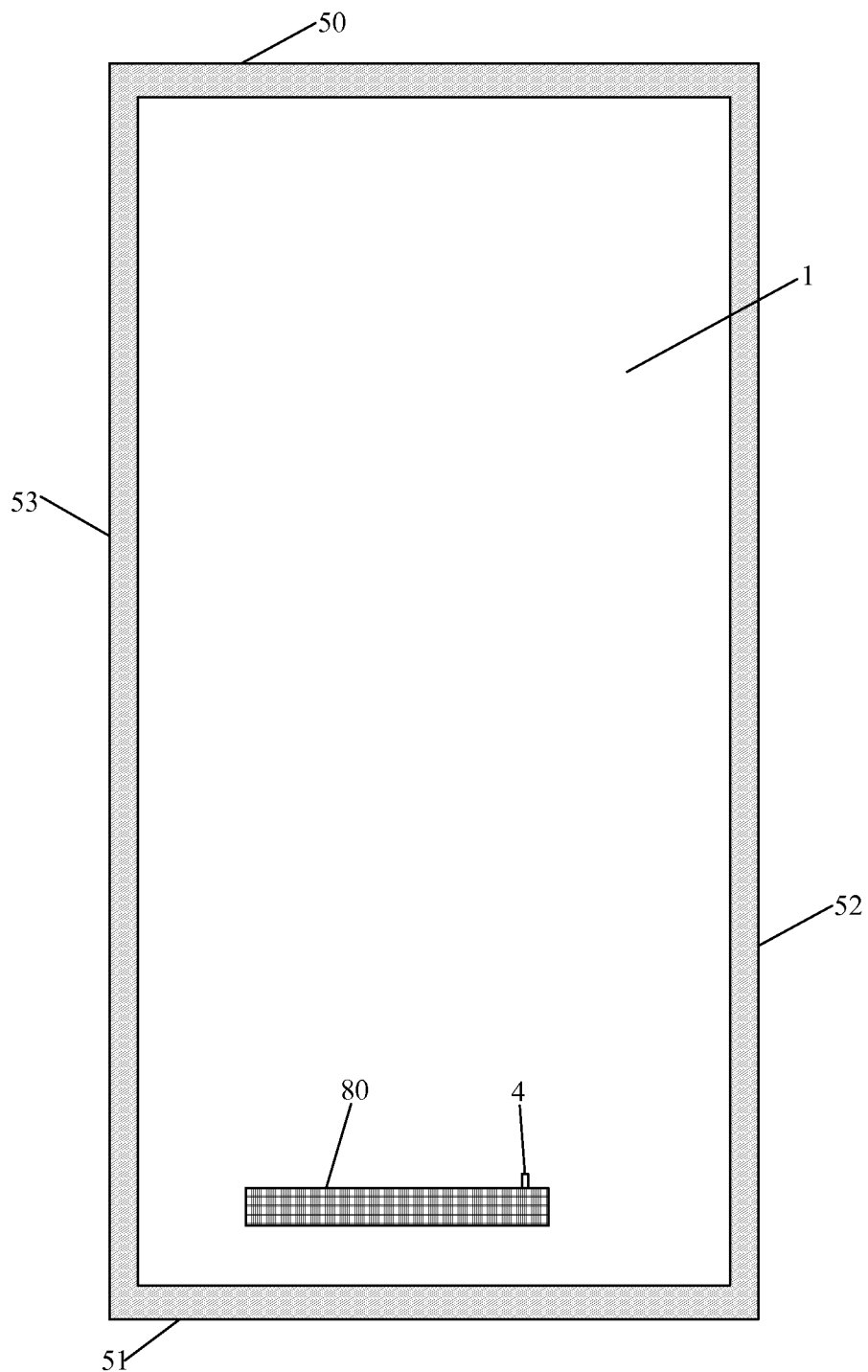
FIG. 1 is a main view of a first mobile terminal according to an embodiment of the present invention.

As shown in FIG. 1, a mobile terminal according to an embodiment of the present invention includes a metal rear cover 1 used as a grounding component and an antenna, where the antenna includes a grounding pin 4, and the grounding pin 4 is electrically connected to the metal rear cover.

The antenna includes an antenna component 8. FIG. 1 schematically shows the antenna component 8, and the antenna component 8 may also be in other shapes, for example, an antenna component 80 shown in FIG. 3.

Figure 2:
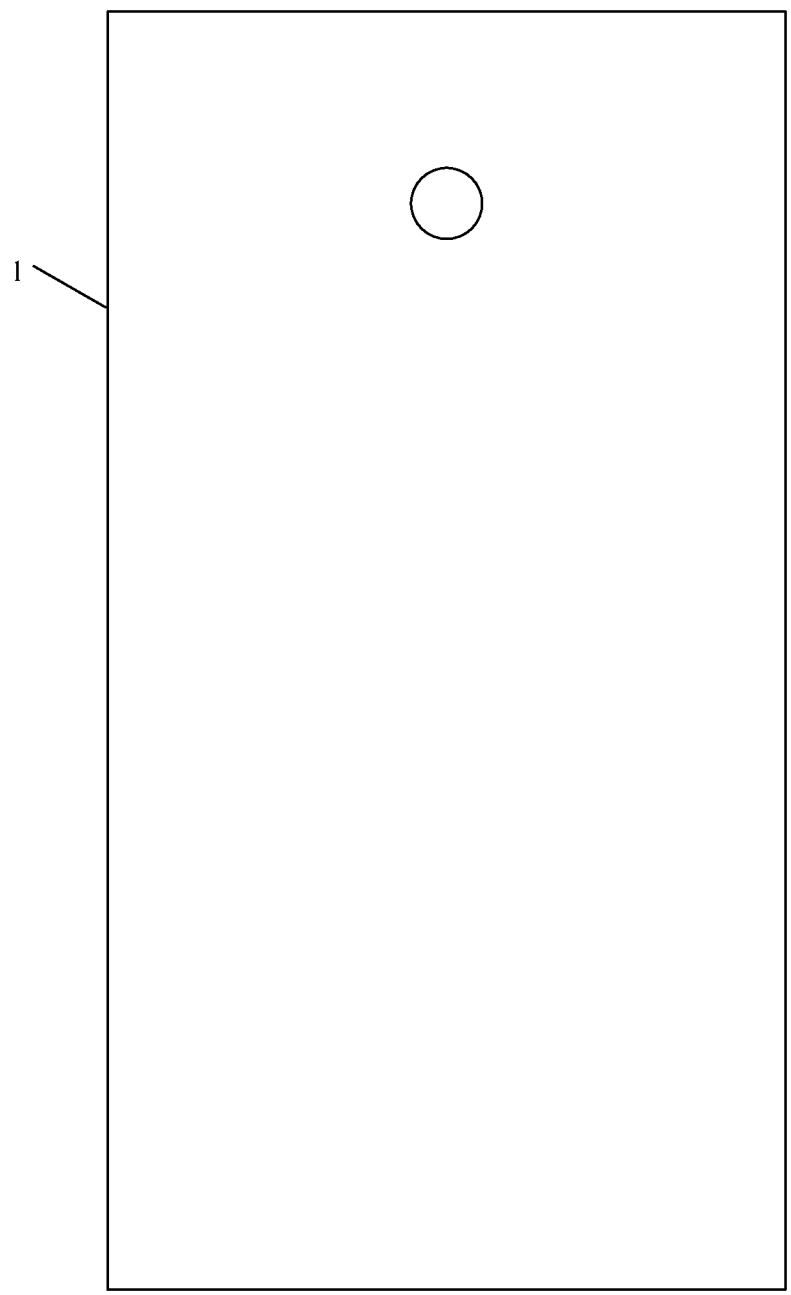
FIG. 2 is a rear view of a first mobile terminal according to an embodiment of the present invention.

Because the metal rear cover 1 is used as the grounding component, and in this way, the metal rear cover 1 is used as a ground cable of the antenna, interference to the antenna from the metal rear cover 1 can be avoided, and integrity of the metal rear cover 1 can be further ensured. Moreover, it can be clearly seen from a rear view (FIG. 2) of the mobile terminal that an entire back of the mobile terminal is all-metal, which not only enables the mobile terminal to have good appearance, but also enables the whole mobile terminal to have relatively good metal texture.

To implement electrical connection between the grounding pin and the metal rear cover 1 used as the grounding component, as an optional solution in this embodiment of the present invention, the grounding pin can be electrically connected to the metal rear cover 1 directly by means of a first electric conductor, where the first electric conductor may be an electrically conductive medium of a metal material category.

Figure 3:
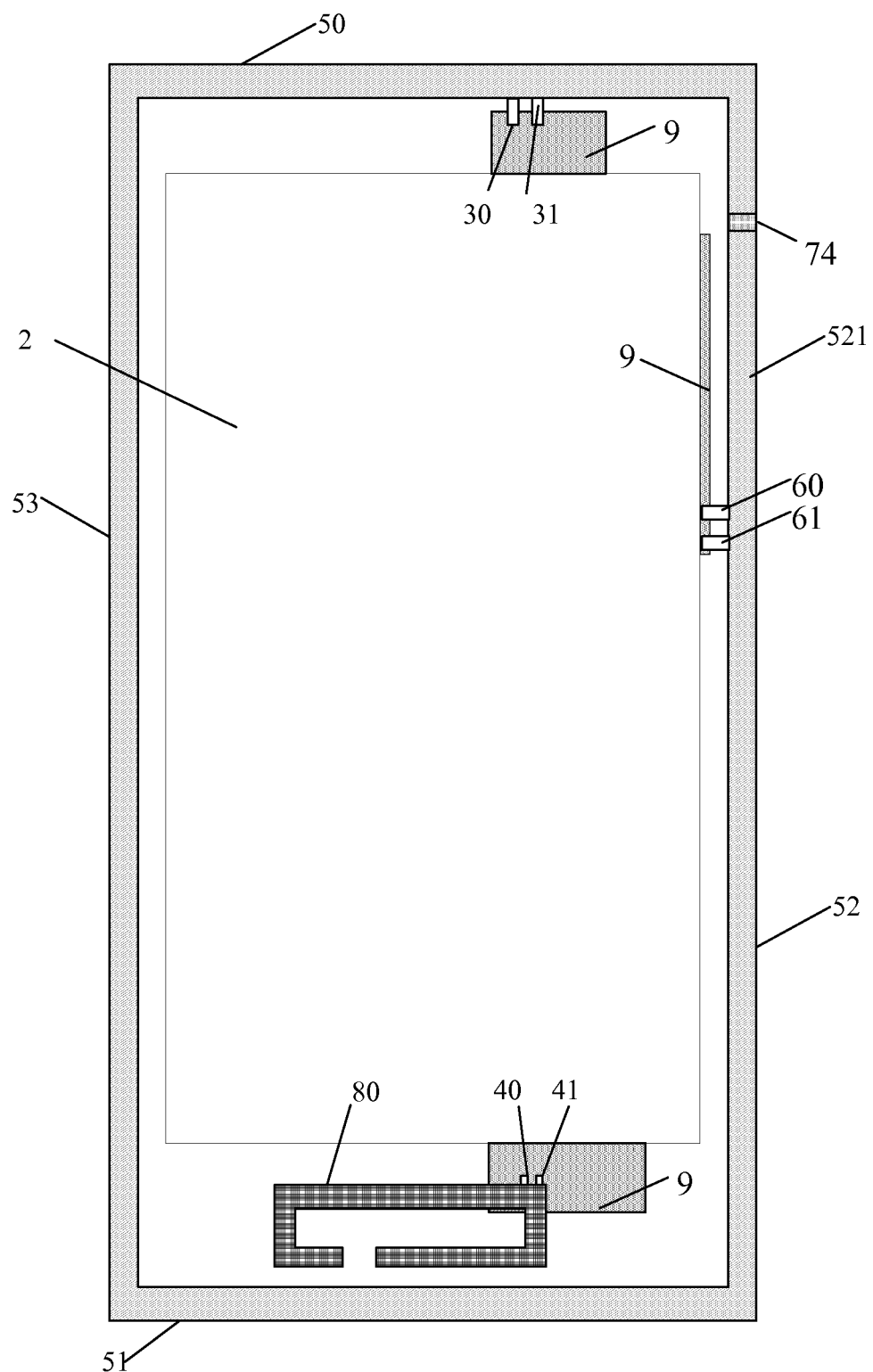
FIG. 3 is a main view of a second mobile terminal according to an embodiment of the present invention.
Figure 4:
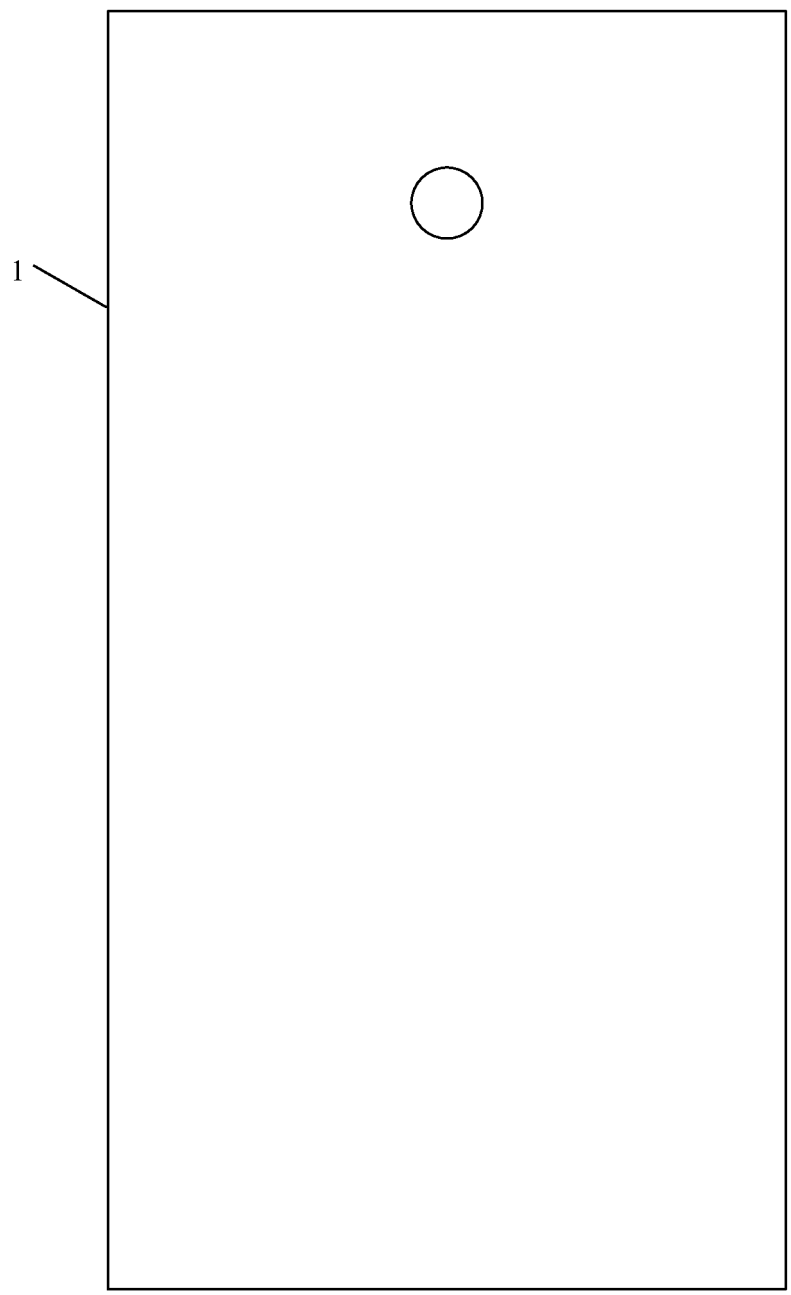
FIG. 4 is a rear view of a second mobile terminal according to an embodiment of the present invention.

FIG. 3 shows a front view of a mobile terminal according to an embodiment of the present invention. The mobile terminal includes a metal rear cover 1, as shown in FIG. 4, used as a grounding component, a display 2, and an antenna, where the antenna is located between an edge of the display and an edge of the metal rear cover, and the antenna may be located on the top, the bottom, the left and the right of the mobile terminal. In the embodiment shown in FIG. 3, antennas are disposed on the top, the bottom, and the right of the mobile terminal, and this embodiment of the present invention is described by separately using an upper antenna, a lower antenna, and a right antenna.

The mobile terminal according to this embodiment of the present invention further includes a printed circuit board (PCB) 9 accommodated between the metal rear cover 1 and the display 2. FIG. 3 shows a part of the printed circuit board, and the remaining part is not drawn in FIG. 3. A radio frequency circuit, a feeding pad, a reference ground, and a grounding pad that are corresponding to each of the antennas are disposed on the printed circuit board 9, and the reference ground or the grounding pad may be connected to the metal rear cover by means of an electrically conductive medium such as an electrically conductive adhesive, a metal dome, or a screw.

The lower antenna includes an antenna component 80, a first grounding pin 40, and a first feeding pin 41. The antenna component 80 is an independent metal component, that is, a separate component. The antenna component 80 may be connected to the reference ground on the printed circuit board 9 by means of the first grounding pin 40, so that the antenna component 80 is electrically connected to the metal rear cover by means of the first grounding pin 40. The antenna component 80 is connected to the radio frequency circuit corresponding to the antenna component 80 on the printed circuit board 9 by means of the first feeding pin 41.

As mentioned above, seen from the back, the mobile terminal in this embodiment of the present invention is all-mental. To make the whole mobile terminal look more of metal texture, bezels of a metal material may be disposed on the metal rear cover 1. In this way, seen from both a side and a front, the mobile terminal has metal bright edges, so that the mobile terminal has more excellent appearance. Moreover, the bezels may be in a bending shape or in a shape similar to a straight shape shown in FIG. 1, which is not limited in this embodiment of the present invention.

As shown in FIG. 1 and FIG. 3, bezels 50 to 53 are disposed on the metal rear cover 1. As mentioned above, to make the whole mobile terminal more of metal texture, the bezels 50 to 53 may be of a metal material. Optionally, any bezel of the bezels 50 to 53 may be of a metal material, or be of a nonmetallic material, or be of both of a metal material and a nonmetallic material.

In the embodiment shown in FIG. 3, the bezels 51 and 53 may be of a metal material, or be of a nonmetallic material, or be of both of a metal material and a nonmetallic material. To implement the upper antenna and the right antenna, the bezels 50 and 52 may be of a metal material or be of both of a metal material and a nonmetallic material.

Figure 5:
FIG. 5 is a schematic structural diagram of an upper bezel of a mobile terminal in FIG. 3.
Figure 6:
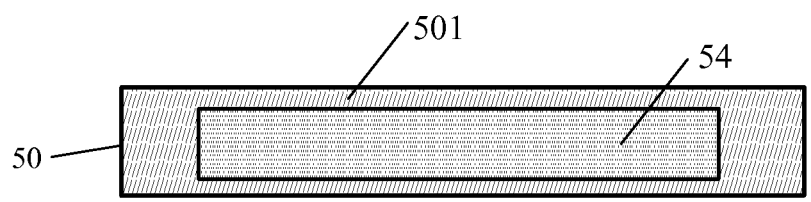
FIG. 6 is a schematic structural diagram of another upper bezel of a mobile terminal in FIG. 3.

As shown in FIG. 5, the bezel 50 is a metal bezel that is grooved in the middle. As shown in FIG. 6, for the sake of beauty, a nonmetallic material (as shown by 54) such as plastic may be embedded in a grooved position, and in this way, the bezel 50 is of both of the metal material and the nonmetallic material.

The upper antenna in FIG. 3 includes an antenna component, a second grounding pin 30, and a second feeding pin 31. The antenna component is a metal structural component of the bezel 50. As shown in FIG. 5, the antenna component is the bezel 50, and as shown in FIG. 6, the antenna component is 501 on the bezel 50. The antenna component is connected to the reference ground on the printed circuit board 9 by means of the second grounding pin 30 to implement electrical connection to the metal rear cover. The antenna component is connected to the radio frequency circuit corresponding to the upper antenna on the printed circuit board 9 by means of the second feeding pin.

Figure 7:
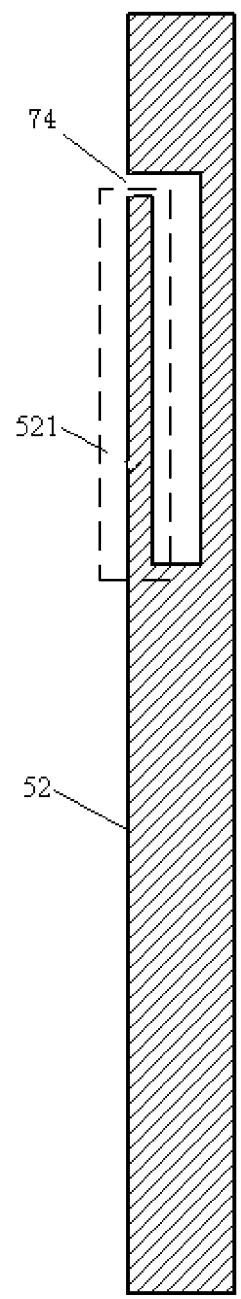
FIG. 7 is a schematic structural diagram of a right bezel of a mobile terminal in FIG. 3.
Figure 8:
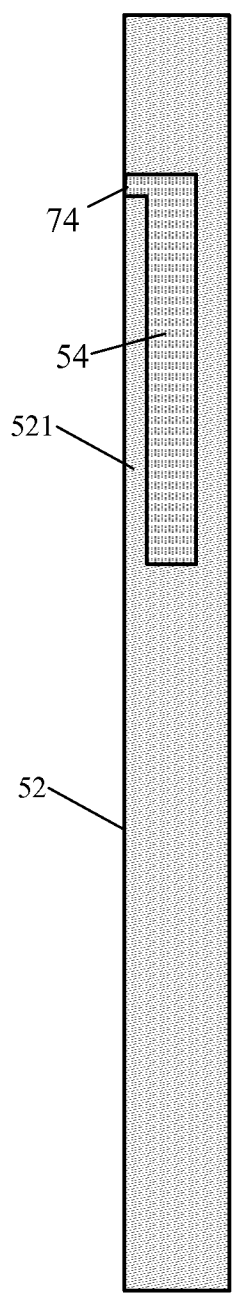
FIG. 8 is a schematic structural diagram of another right bezel of the mobile terminal in FIG. 3.

As shown in FIG. 7, to implement the right antenna, the side bezel 52 is of a metal material, and the side bezel 52 has a metal thin bezel 521. One end of the metal thin bezel is opened, that is, one end of the metal thin bezel 521 is a gap 74. For the sake of beauty, as shown in FIG. 8, the nonmetallic material (such as 54) may be embedded in a blank area of the side bezel 52, that is, the side bezel 52 is of both of the metal material and the nonmetallic material by using the embodiment shown in FIG. 8.

The right antenna of the mobile terminal shown in FIG. 3 includes an antenna component 521, a third grounding pin 60, and a third feeding pin 31. The antenna component 521 is a part of a metal structural component of the bezel 52. The antenna component 521 is connected to the reference ground on the printed circuit board 9 by means of the third grounding pin 60 to implement electrical connection to the metal rear cover. The antenna component is connected to the radio frequency circuit corresponding to the right antenna on the printed circuit board 9 by means of the third feeding pin.

Figure 9:
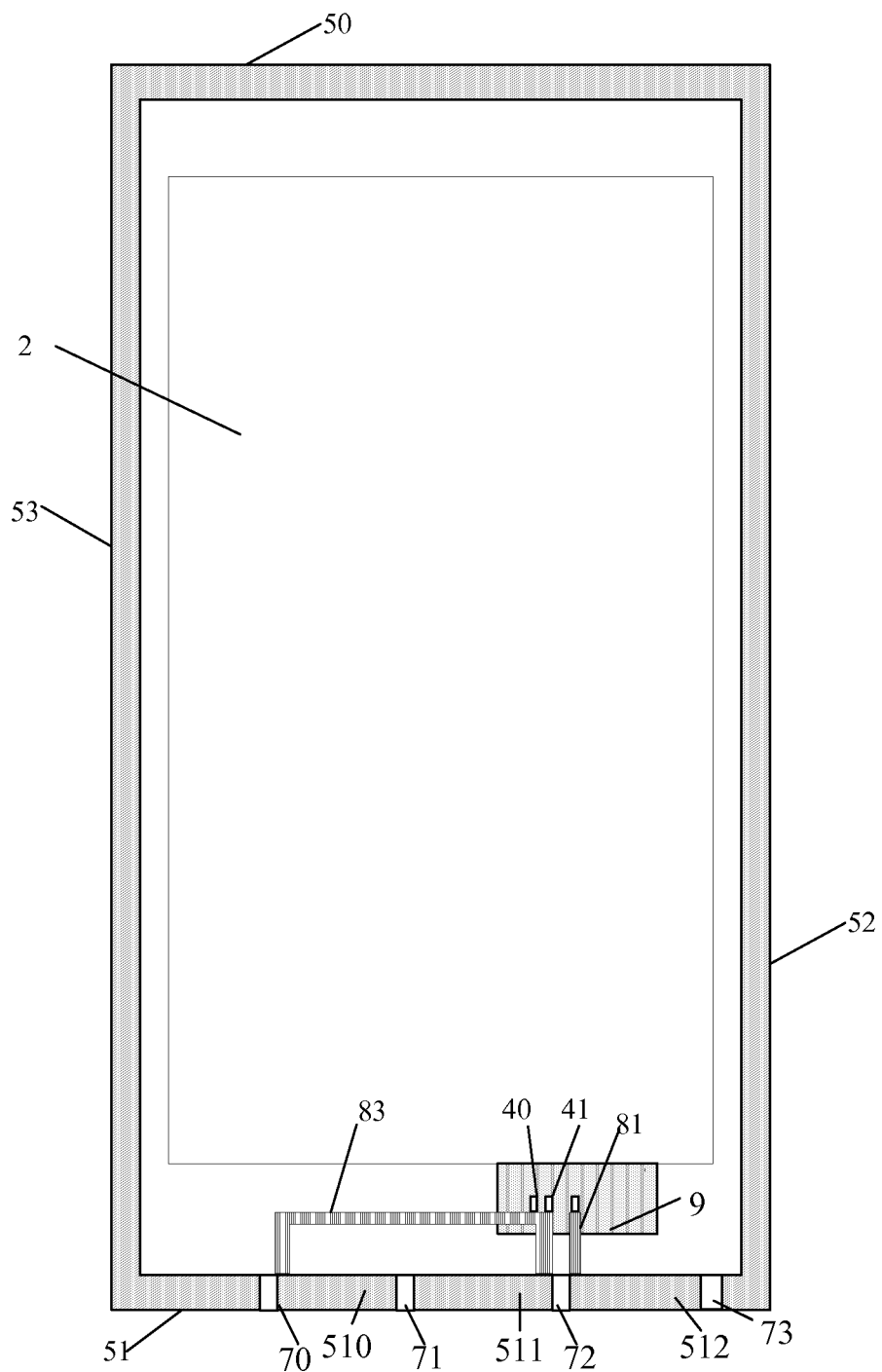
FIG. 9 is a main view of a third mobile terminal according to an embodiment of the present invention.
Figure 10:
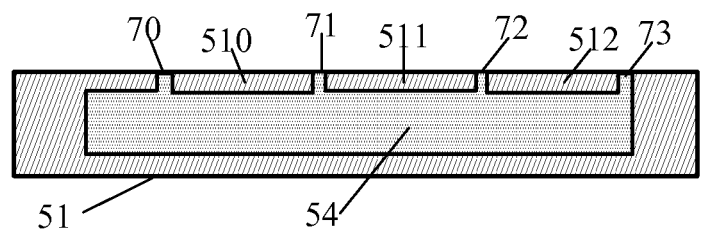
FIG. 10 is a schematic diagram of a lower bezel of a mobile terminal in FIG. 9.

As shown in FIG. 9, FIG. 9 is a view of a mobile terminal according to another embodiment of the present invention. The mobile terminal includes a metal rear cover 1 shown in FIG. 2 or FIG. 4, a display screen 2, a printed circuit board 9, and a lower antenna. Bezels are disposed around the metal rear cover, where a lower bezel 51 includes a metal material and a nonmetallic material to form metal thin bezels 510 and 511 shown in FIG. 10. The lower antenna includes an antenna component, a first grounding pin 40, and a second feeding pin 41. The antenna component includes an antenna wire 83, and the metal thin bezels 510 and 511. Compared with the lower antenna shown in FIG. 3, the lower antenna shown in FIG. 9 utilizes a part of a metal structural component (the metal thin bezels 510 and 511) of the bezel 51, which can reduce space occupied by the lower antenna.

As shown in FIG. 9, a parasitic component of the antenna component 80 is disposed in a position that is close to, for example, 1 mm to 2 mm away from the first feeding pin 41. To implement performance of the specific parasitic component, a metal thin bezel 512 may be formed on the lower bezel 51, and an antenna wire 81 and the metal thin bezel 512 jointly implement a function of the parasitic component. A position of the antenna wire 81 and a position of a gap 73 are set according to design needs of antenna performance.

It can be seen from the upper antenna and the right antenna in the embodiment shown in FIG. 3 and the lower antenna shown in FIG. 9 that the antenna components are partially or completely the metal structural components of the bezels, which can reduce space occupied by the antennas.

In the embodiment of the present invention, because a metal rear cover is used as a grounding component, and in this way, the metal rear cover is used as a ground cable of an antenna, interference to the antenna from the metal rear cover can be avoided, and integrity of the metal rear cover can be further ensured. Moreover, it can be clearly seen from a rear view of a mobile terminal that an entire back of the mobile terminal is all-metal, which not only enables the mobile terminal to have good appearance, but also enables the whole mobile terminal to have relatively good metal texture.

The foregoing descriptions are merely a specific embodiment of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobile terminal, comprising:
   a front side including a display;
   a rear side including a metal rear cover used as a grounding component, the metal rear cover including a bezel disposed thereon, a first portion of the bezel being a metal material and a second portion of the bezel is a non-metallic material, and a thickness of the second portion is greater than a thickness of the first portion;
   a printed circuit board, disposed between the display and the metal rear cover, including a reference ground disposed on the printed circuit board and electrically connected to the metal rear cover; and
   at least one antenna including a grounding pin electrically connected at one end of the grounding pin to the reference ground of the printed circuit board and electrically connected at another end of the grounding pin to the first portion of the bezel that is the metal material.

2. The mobile terminal according to claim 1, wherein the another end of the grounding pin is electrically connected to the first portion of the bezel by a first electric conductor.

3. The mobile terminal according to claim 1, wherein the printed circuit board further includes a radio frequency circuit disposed on the printed circuit board.

4. The mobile terminal according to claim 3, wherein the at least one antenna further includes a feeding pin electrically connected to the radio frequency circuit.

5. The mobile terminal according to claim 1, wherein the at least one antenna further includes an antenna component.

6. The mobile terminal according to claim 5, wherein the antenna component is an independent metal component.

7. The mobile terminal according to claim 5, wherein the antenna component is partially or completely made up of a metal structural component of the bezel.

8. The mobile terminal according to claim 7, wherein the antenna component is partially or completely made up of a part of the metal structural component of the bezel.

9. A mobile terminal, comprising:
   a front side including a display;
   a rear side including a metal rear cover used as a grounding component;
   a printed circuit board, disposed between the display and the metal rear cover, including a reference ground disposed on the printed circuit board and electrically connected to the metal rear cover;
   at least one antenna including a grounding pin electrically connected at one end of the grounding pin to the reference ground of the printed circuit board and electrically connected at another end of the grounding pin to the metal rear cover;
   at least one other printed circuit board, disposed between the display and the metal rear cover, including another reference ground disposed on the at least one other printed circuit board and connected to the metal rear cover; and
   at least one other antenna including another grounding pin electrically connected at one end of the another grounding pin to the another reference ground of the at least one other printed circuit board to electrically connect the at least one other antenna to the metal rear cover via the another grounding pin.

10. The mobile terminal according to claim 9, wherein a bezel is disposed on the metal rear cover.

11. A mobile terminal, comprising:
    a front side including a display;
    a rear side including a metal rear cover used as a grounding component, the metal rear cover including a side bezel disposed thereon, a gap in a portion of the side bezel being embedded with a non-metallic material, and a remaining portion of the side bezel being a metal material;

a printed circuit board, disposed between the display and the metal rear cover, including a reference ground disposed on the printed circuit board and electrically connected to the metal rear cover;

at least one antenna including a grounding pin electrically connected at one end of the grounding pin to the reference ground of the printed circuit board and electrically connected at another end of the grounding pin to the metal rear cover;

wherein the remaining portion of the side bezel includes a thin metal portion disposed adjacent to the gap in the portion of the side bezel embedded with the non-metallic material in a width direction of the side bezel, the thin metal portion is electrically connected to the another end of the grounding pin, and the thin metal portion has a thickness less than a thickness of the gap in the portion of the side bezel embedded with the non-metallic material.

12. A mobile terminal, comprising:

a front side including a display;

a rear side including a metal rear cover used as a grounding component, the metal rear cover including a bezel disposed thereon, a first portion of the bezel being a metal material, a second portion of the bezel being the metal material, and a third portion of the bezel, disposed between the first portion of the bezel and the second portion of the bezel, being a non-metallic material;

a printed circuit board, disposed between the display and the metal rear cover, including a reference ground disposed on the printed circuit board and electrically connected to the metal rear cover; and at least one antenna including:

a grounding pin electrically connected to the reference ground of the printed circuit board, and an antenna component including a first antenna wire electrically connected at one end of the first antenna wire to the first portion of the bezel disposed on the metal rear cover, and electrically connected at another end of the first antenna wire to the second portion of the bezel disposed on the metal rear cover.

13. The mobile terminal according to claim 12, further comprising:

a parasitic component of the antenna component including a second antenna wire disposed spaced apart from the antenna component and electrically connected to the metal rear cover.

14. A mobile terminal, comprising:

a front side including a display;

a rear side including a metal rear cover used as a grounding component, the metal rear cover including a bezel disposed thereon, a first portion of the bezel being a metal material and a second portion of the bezel being a non-metallic material;

a printed circuit board, disposed between the display and the metal rear cover, including a reference ground disposed on the printed circuit board and electrically connected to the metal rear cover; and at least one antenna including:

a grounding pin electrically connected to the reference ground of the printed circuit board, and an antenna component including a first antenna wire electrically connected to the first portion of the bezel, wherein a width of the second portion in a widthwise direction of the mobile terminal is less than a width of the first portion.

15. A mobile terminal, comprising:

a front side including a display;

a rear side including a metal rear cover used as a grounding component, the metal rear cover including a bezel disposed thereon, a first portion of the bezel being a metal material, a second portion of the bezel being a non-metallic material, and a third portion of the bezel being a non-metallic material and disposed between the first portion of the bezel and the second portion of the bezel;

a printed circuit board, disposed between the display and the metal rear cover, including a reference ground disposed on the printed circuit board and electrically connected to the metal rear cover;

at least one antenna including:

a grounding pin electrically connected to the reference ground of the printed circuit board, and an antenna component including a first antenna wire electrically connected to the first portion of the bezel; and a parasitic component of the antenna component including a second antenna wire disposed spaced apart from the antenna component and electrically connected to the second portion of the bezel.

16. A mobile terminal, comprising:

a front side including a display;

a rear side including a metal rear cover used as a grounding component, the metal rear cover including a side bezel disposed thereon, a first portion of the side bezel including a plurality of gaps embedded with a non-metallic material and a second portion of the side bezel including a metal material;

a printed circuit board, disposed between the display and the metal rear cover, including a reference ground disposed on the printed circuit board and electrically connected to the metal rear cover;

at least one antenna including:

a grounding pin electrically connected to the reference ground of the printed circuit board, and an antenna component including a first antenna wire electrically connected to the metal rear cover; and a parasitic component of the antenna component including a second antenna wire disposed spaced apart from the antenna component and electrically connected to the metal rear cover, and wherein the second portion of the side bezel includes:

a first thin metal portion, disposed adjacent to a first gap among the plurality of gaps in a width direction of the side bezel, electrically connected to the first antenna wire, a second thin metal portion, disposed adjacent to a second gap among the plurality of gaps in the width direction of the side bezel, electrically connected to the second antenna wire, and one of the first gap and the second gap is disposed between the first thin metal portion and the second thin metal portion in the width direction of the side bezel.

17. The mobile terminal according claim 16, wherein the first thin metal portion and the second thin metal portion each have a width that is greater than a width of each of the plurality of gaps in the width direction of the side bezel.

\* \* \* \* \*